United States Patent
Arner

(10) Patent No.: US 11,027,223 B2
(45) Date of Patent: Jun. 8, 2021

(54) FLUID CONTROL SYSTEM HAVING A GAS SEPARATING SYSTEM

(71) Applicant: HAMILTON SUNDSTRAND CORPORATION, Charlotte, NC (US)

(72) Inventor: Michael D. Arner, Tolland, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 288 days.

(21) Appl. No.: 16/011,149

(22) Filed: Jun. 18, 2018

(65) Prior Publication Data
US 2019/0381426 A1 Dec. 19, 2019

(51) Int. Cl.
| | | |
|---|---|---|
| *B01D 19/00* | (2006.01) | |
| *B01D 17/02* | (2006.01) | |
| *B01D 17/12* | (2006.01) | |
| *B01D 45/12* | (2006.01) | |
| *B04C 3/06* | (2006.01) | |

(52) U.S. Cl.
CPC ..... *B01D 19/0057* (2013.01); *B01D 17/0217* (2013.01); *B01D 17/12* (2013.01); *B01D 45/12* (2013.01); *B04C 3/06* (2013.01)

(58) Field of Classification Search
CPC ........ B01D 19/00; B01D 17/12; B01D 17/02; B01D 45/12; B04C 3/06
See application file for complete search history.

(56) References Cited

U.S. PATENT DOCUMENTS

| | | | |
|---|---|---|---|
| 4,848,987 A | 7/1989 | Howard et al. | |
| 7,931,719 B2 * | 4/2011 | Sams | B01D 45/12 55/348 |
| 9,879,663 B2 | 1/2018 | Ellis | |
| 2007/0193285 A1 | 8/2007 | Knight et al. | |
| 2014/0196494 A1 * | 7/2014 | Popov | F25B 1/06 62/426 |
| 2016/0200170 A1 * | 7/2016 | Kawamoto | F25B 41/067 62/157 |

FOREIGN PATENT DOCUMENTS

WO 2015020719 A1 2/2015

OTHER PUBLICATIONS

European Search Report for European Application No. 19179692.9 dated Nov. 27, 2019, 7 pages.

* cited by examiner

*Primary Examiner* — Youngsul Jeong
(74) *Attorney, Agent, or Firm* — Cantor Colburn LLP

(57) ABSTRACT

A fluid control system includes a vortex separator, a fluid pump, an eductor, and an accumulator. The vortex separator has a fluid inlet arranged to receive a fluid, a first fluid outlet arranged output a first phase of the fluid, and a second fluid outlet arranged to output at least one of a non-condensable gas and a second phase of the fluid. The fluid pump has a pump outlet and a pump inlet that is fluidly connected to the first fluid outlet. The eductor has a first eductor inlet fluidly connected to the pump outlet, a second eductor inlet fluidly connected to the second fluid outlet, and an eductor outlet. The accumulator has an accumulator inlet fluidly connected to the eductor outlet and an accumulator outlet fluidly connected to the fluid inlet.

14 Claims, 1 Drawing Sheet

FLUID CONTROL SYSTEM HAVING A GAS SEPARATING SYSTEM

BACKGROUND

Exemplary embodiments pertain to the art of two-phase fluid flow systems having an integrated gas separating system.

Fluid control systems may be provided with liquid pumps that may encounter difficulties should a gas be present within the liquid. Should the gas encounter the liquid pump, partial loss or total loss of the pump performance may occur.

BRIEF DESCRIPTION

Disclosed is a fluid control system that includes a vortex separator, a fluid pump, an eductor, and an accumulator. The vortex separator has a fluid inlet arranged to receive a fluid, a first fluid outlet arranged output a first phase of the fluid, and a second fluid outlet arranged to output at least one of a non-condensable gas and a second phase of the fluid. The fluid pump has a pump outlet and a pump inlet that is fluidly connected to the first fluid outlet. The eductor has a first eductor inlet fluidly connected to the pump outlet, a second eductor inlet fluidly connected to the second fluid outlet, and an eductor outlet. The accumulator has an accumulator inlet fluidly connected to the eductor outlet and an accumulator outlet fluidly connected to the fluid inlet.

Also disclosed is a gas separating system provided with a fluid control system. The gas separating system includes a vortex separator, an eductor, and an accumulator. The vortex separator has a fluid inlet arranged to receive a fluid from an environmental control system, a first fluid outlet arranged output a first phase of the fluid, and a second fluid outlet arranged to output a second phase of the fluid. The eductor has a first eductor inlet fluidly connected to the first fluid outlet and arranged to receive the first phase, a second eductor inlet fluidly connected to the second fluid outlet and arranged to receive the second phase, and an eductor outlet arranged to output the first phase and the second phase. The accumulator has an accumulator inlet fluidly connected to the eductor outlet and arranged to receive the first phase and the second phase and an accumulator outlet fluidly connected to the fluid inlet and arranged to output the first phase.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
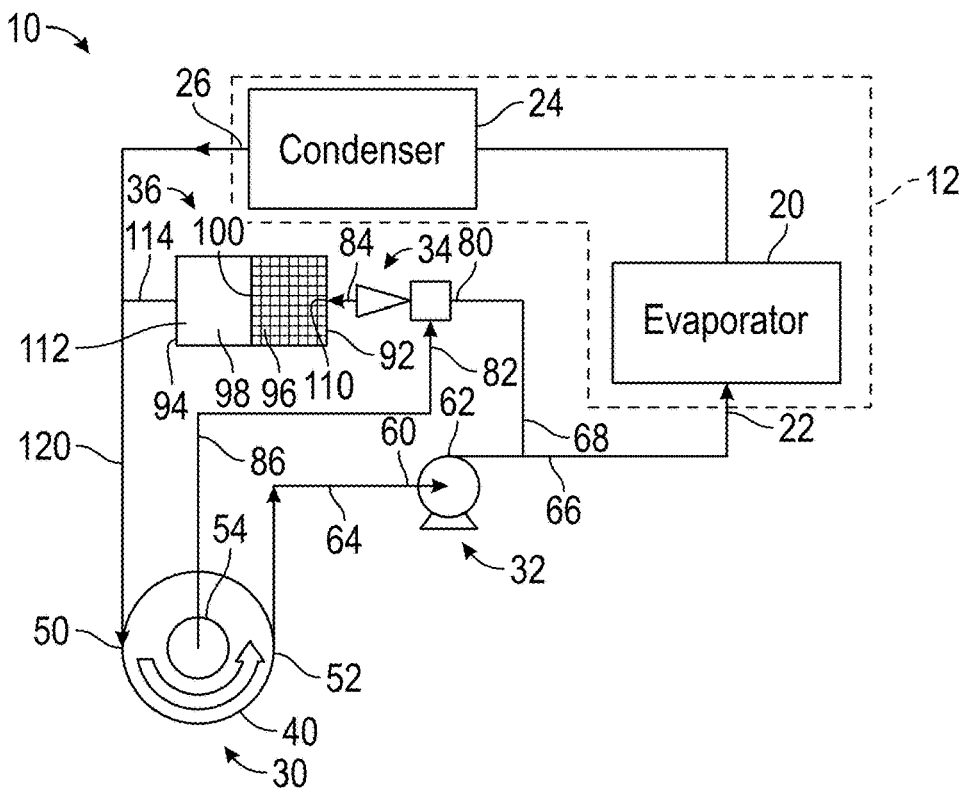
FIG. 1 is a schematic illustration of a fluid control system.

Referring to FIG. 1, a fluid control system 10 is provided. The fluid control system 10 may be a closed-loop system that may contain unwanted gas. In the embodiment shown, the fluid control system 10 is provided with or in communication with at least a portion of an environmental control system 12. The environmental control system 12 may include an evaporator 20 having an inlet 22 that receives a fluid and a condenser 24 having an outlet 26 that outputs the fluid.

The evaporator 20 having the inlet 22 receives the fluid, which may be in a first phase, such as a liquid phase. The evaporator 20 may output the fluid in a second phase, such as a gas phase, a non-condensable gas, or a vapor phase, to the condenser 24. The condenser 24 may then condense the second phase back to the first phase, e.g. the liquid phase. The second phase may not completely condense back to the first phase in the condenser 24 such that gas or vapor may be present within the fluid making the fluid a two-phase fluid having both the first phase and the second phase present after it exits the condenser 24 through the outlet 26. Also, non-condensable gases may be present within the fluid, also resulting in a two-phase fluid.

The fluid control system 10 is arranged to separate a gas or vapor from the fluid (e.g. working fluid) that flows through the fluid control system 10 and subsequently store the gas or vapor to prevent challenges to a fluid pump, due to the presence of the gas or vapor. The fluid control system 10 is provided as a closed loop fluid control system in a device that is capable of operation within a 0G or low gravity environment. The fluid control system 10 includes a vortex separator 30, a fluid pump 32, an eductor 34, and an accumulator 36.

Figure 2:
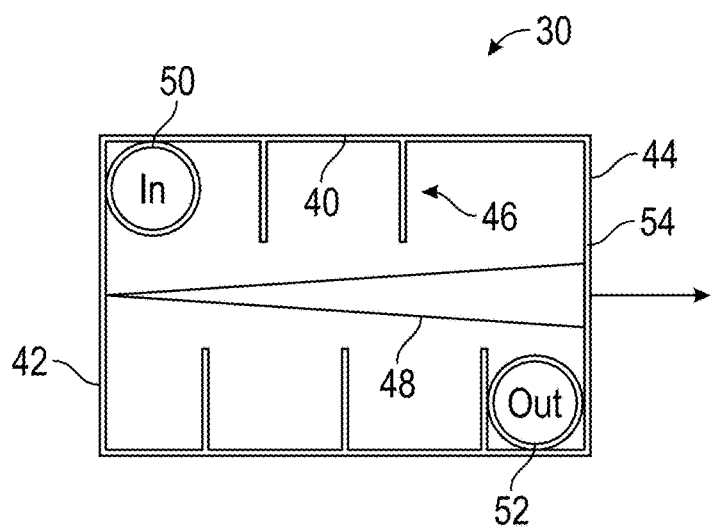
FIG. 2 is a vortex separator of the fluid control system.

Referring to FIGS. 1 and 2, vortex separator 30 and the eductor 34 may be a passive components that are operated by fluid energy already imparted to the fluid by the fluid pump 32 without an additional pump, driving source, or moving parts provided with the vortex separator 30 or the eductor 34. In such an arrangement, there is no additional power source provided with the fluid control system 10 other than the fluid pump 32.

The vortex separator 30 includes a separator body 40 that extends between a first end 42 and a second end 44, a series of baffles 46 that are disposed within the separator body 40, and a passageway 48 that extends through the series of baffles 46.

The separator body 40 defines a fluid inlet 50, a first fluid outlet 52, and a second fluid outlet 54. The fluid inlet 50 is disposed proximate the first end 42. The fluid inlet 50 may be at least partially defined within or by the separator body 40 and the first end 42. The fluid inlet 50 is arranged to receive a fluid, such as the two-phase fluid, from the outlet 26 of the environmental control system 12. The first fluid outlet 52 is disposed proximate the second end 44. The first fluid outlet 52 may be at least partially defined within or defined by the separator body 40 and the second end 44. The first fluid outlet 52 is arranged to output a first phase of the fluid to the fluid pump 32. The second fluid outlet 54 is at least partially defined by or is defined by the second end 44 of the separator body 40. The passageway 48 receives a second phase of the fluid that is separated from the fluid by the series of baffles 46. The passageway 48 directs the second phase of the fluid towards the second fluid outlet 54. The second fluid outlet 54 is arranged to output the second phase of the fluid to the eductor 34.

Referring to FIG. 1, the fluid pump 32 includes a pump inlet 60 and a pump outlet 62. The pump inlet 60 is fluidly connected to the first fluid outlet 52 of the vortex separator 30 by a conduit 64 that extends between the vortex separator 30 and the fluid pump 32.

The fluid pump 32 is arranged as a liquid pump that provides the first phase of the liquid to the evaporator 20 of the environmental control system 12 through a first pump outlet conduit 66 that extends between the inlet 22 of the environmental control system 12 and the pump outlet 62. The fluid pump 32 provides the first phase of the liquid to the eductor 34 through a second pump outlet conduit 68 that may extend from the first pump outlet conduit 66 or may extend from the pump outlet 62. The second pump outlet conduit 68 extends between the pump outlet 62 and an inlet of the eductor 34.

The eductor 34 includes a first eductor inlet 80, a second eductor inlet 82, and an eductor outlet 84. The first eductor inlet 80 is arranged to receive the first phase of the fluid from the fluid pump 32 through the second pump outlet conduit 68. The second eductor inlet 82 is arranged to receive the first phase of the fluid from the second fluid outlet 54 of the vortex separator 30 through a conduit 86. The conduit 86 extends between the second fluid outlet 54 of the vortex separator 30 and the second eductor inlet 82.

The eductor 34 is arranged to entrain the second phase of the fluid from the vortex separator 30 with the first phase of the fluid from the fluid pump 32. The entrained second phase with the first phase of the fluid is output by the eductor 34 through the eductor outlet 84 to the accumulator 36 through another conduit or directly to the accumulator 36. The eductor 34 is robust such that if the second phase or secondary fluid is all liquid, all gas/vapor, or a mixture of the aforementioned. The eductor 34 is arranged to continue to pump or flow the second phase or secondary fluid with varying flow rates based on the second phase or secondary fluid.

The accumulator 36 is arranged to receive and store the second phase of the fluid and provide the first phase of the fluid back to the vortex separator 30. The accumulator 36 includes an accumulator body 90 that extends between a first accumulator end 92 and a second accumulator end 94. The accumulator body 90 encloses or defines a storage container 96 and a flow-through chamber 98 that are separated from each other by a porous barrier 100.

An accumulator inlet 110 is defined proximate or by the first accumulator end 92. The accumulator inlet 110 is fluidly connected to the eductor outlet 84. The accumulator inlet 110 is arranged to receive the entrained second phase with the first phase of the fluid that is output by the eductor 34.

The porous barrier 100 is arranged to separate a liquid (e.g. the first phase of the liquid) from a gas or vapor (e.g. the second phase of the liquid). The porous barrier 100 is arranged to separate the entrained second phase of the fluid from the first phase of the fluid and facilitates the trapping/storage/isolation of the second phase of the fluid within the storage container 96. The storage container 96 isolates the second phase of the fluid from the remainder of the fluid control system 10. The storage container 96 may be a non-condensable gas storage container. The first phase of the fluid is separated from the second phase of the fluid by the porous barrier 100 and flows through the flow-through chamber 98 and through an accumulator outlet 112.

The accumulator outlet 112 is defined proximate or by the second accumulator end 94. The accumulator outlet 112 is fluidly connected to the fluid inlet 50 of the vortex separator 30 through a conduit 114 and is arranged to output the first phase of the fluid to the fluid inlet 50 of the vortex separator 30.

The conduit 114 outputs the first phase of the fluid into a conduit 120 that extends between the outlet 26 of the environmental control system 12 and the fluid inlet 50 of the vortex separator 30. The conduit 120 directs the two phase liquid from the condenser 24 towards the vortex separator 30 and receives the first phase of the fluid from the accumulator 36.

In at least one embodiment, the accumulator 36 may be arranged as a secondary condenser should the second phase of the liquid be a vapor. In such an embodiment, the accumulator 36 may be arranged to remove heat such that the vapor may be condensed to a liquid within the accumulator 36 and rejoin the primary flow path of the liquid through the accumulator outlet 112.

The lack of moving parts provided with the vortex separator 30 and the eductor 34 improves the reliability and life of the fluid control system 10. Furthermore, the fluid control system 10 employs passive controls without actuated valves or other active controls.

The fluid control system 10 of the present disclosure is arranged to separate and store gas/vapor from a liquid in a zero gravity or micro gravity environment (e.g. not gravity dependent). The fluid control system 10 of the present disclosure performs without an external vent or overboard vent. The lack of the external vent or overboard vent eliminates a potential fluid leakage path where the closed loop could lose fluid.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fluid control system, comprising:
a vortex separator having a fluid inlet arranged to receive a fluid, a first fluid outlet arranged output a first phase of the fluid, and a second fluid outlet arranged to output at least one of a non-condensable gas and a second phase of the fluid;
a fluid pump having a pump outlet and a pump inlet fluidly connected to the first fluid outlet;
an eductor having an eductor liquid inlet fluidly connected to the pump outlet that receives the output of the fluid pump, a gas eductor inlet fluidly connected to the second fluid outlet that receives the second phase of the fluid from the vortex separator, and an eductor outlet; and an accumulator having an accumulator inlet fluidly connected to the eductor outlet and an accumulator outlet fluidly connected to the fluid inlet.

2. The fluid control system of claim 1, wherein the first phase of the fluid is a liquid phase.

3. The fluid control system of claim 1, wherein the second phase of the fluid is at least one of a gas and a vapor.

4. The fluid control system of claim 1, wherein the eductor is arranged to entrain the second phase of the fluid within the first phase of the fluid.

5. The fluid control system of claim 4, wherein the accumulator is arranged to separate the entrained second phase of the fluid from the first phase of the fluid.

6. The fluid control system of claim 4, wherein the accumulator is arranged to receive and store the second phase of the fluid and provide the first phase of the fluid to the fluid inlet.

7. A gas separating system provided with a fluid control system, comprising:
- a vortex separator having a fluid inlet arranged to receive a fluid from an environmental control system, a first fluid outlet arranged to output a first phase of the fluid, and a second fluid outlet arranged to output a second phase of the fluid;
- a fluid pump having a pump outlet and a pump inlet fluidly connected to the first fluid outlet;
- an eductor having an eductor liquid inlet fluidly connected to the pump outlet that receives the output of the fluid pump, a gas eductor inlet fluidly connected to the second fluid outlet that receives the second phase of the fluid from the vortex separator, and an eductor outlet; and
- an accumulator having an accumulator inlet fluidly connected to the eductor outlet and arranged to receive the first phase of the fluid and the second phase of the fluid and an accumulator outlet fluidly connected to the fluid inlet and arranged to output the first phase of the fluid.

8. The gas separating system of claim 7, wherein the vortex separator includes a series of baffles disposed within a separator body arranged to separate the first phase of the fluid from the second phase of the fluid.

9. The gas separating system of claim 8, wherein the separator body extends between a first end and a second end.

10. The gas separating system of claim 9, wherein the fluid inlet is disposed proximate the first end.

11. The gas separating system of claim 9, wherein the first fluid outlet is disposed proximate the second end.

12. The gas separating system of claim 9, wherein the second fluid outlet is at least partially defined by the second end.

13. The gas separating system of claim 7, wherein the accumulator includes a storage container that is arranged to store the second phase of the fluid.

14. The gas separating system of claim 7, wherein the accumulator is arranged to separate the second phase of the fluid from the first phase of the fluid.

* * * * *